3,036,569
LUNG-AIRWAY RESISTANCE METER
John A. Clements and Milton E. Wirth, Baltimore, Md., assignors to the United States of America as represented by the Secretary of the Army
Filed Aug. 4, 1959, Ser. No. 831,680
5 Claims. (Cl. 128—2)
(Granted under Title 35, U.S. Code (1952), sec. 266)

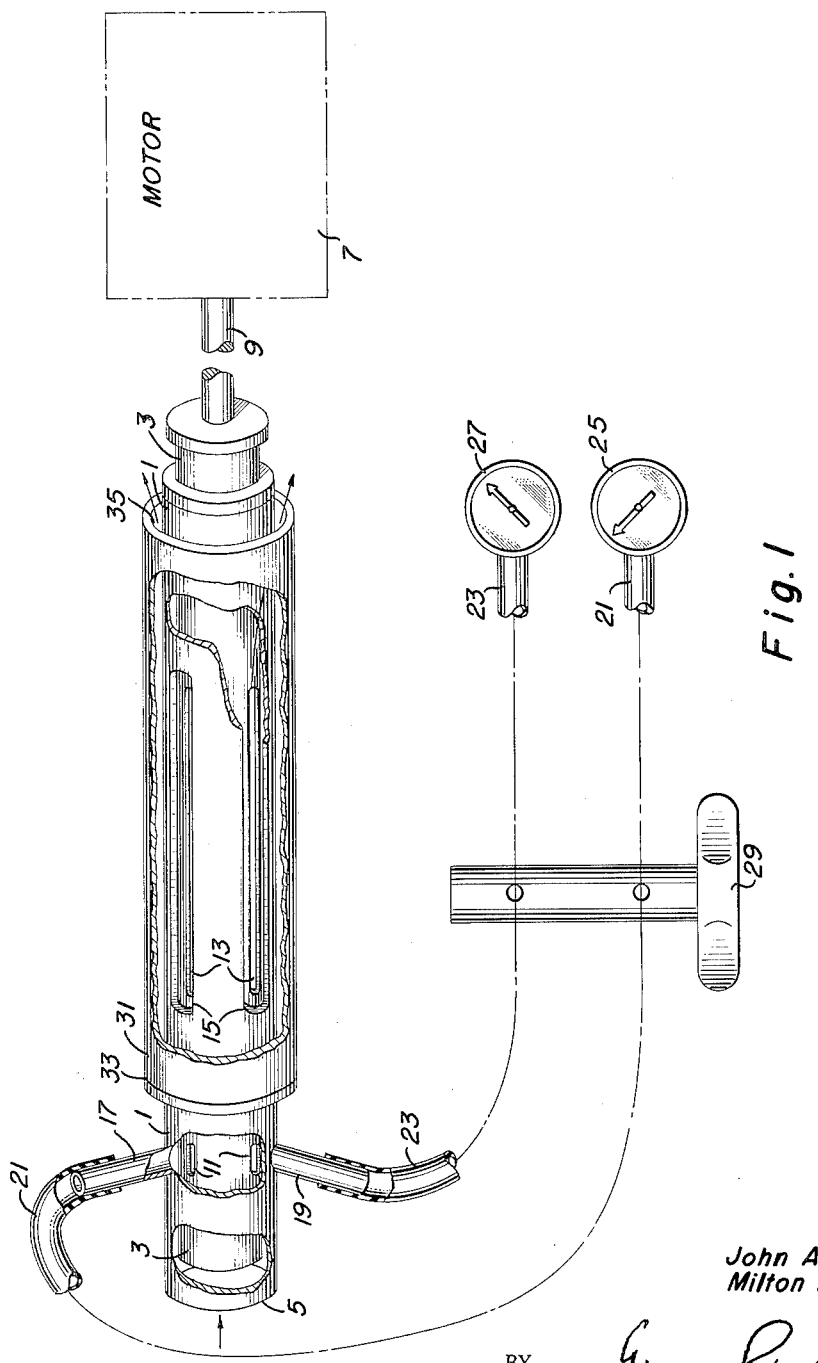

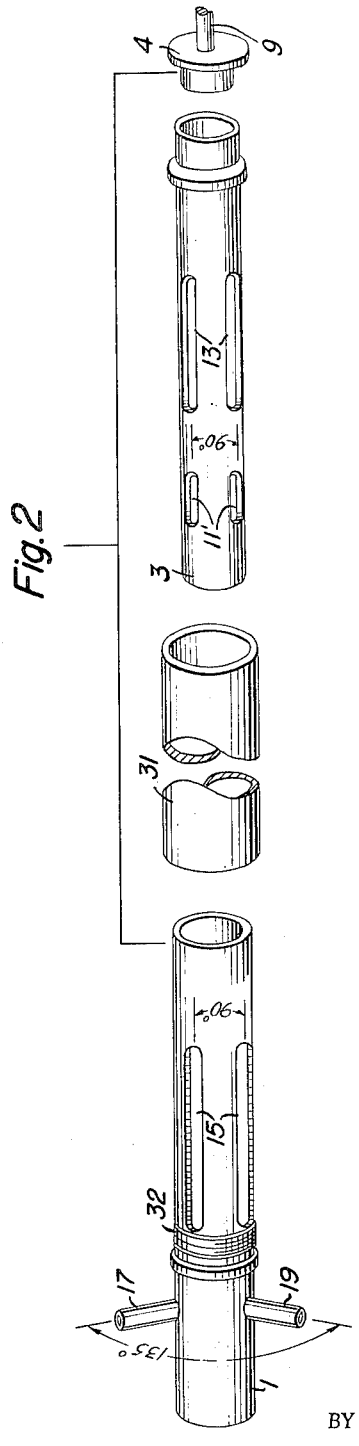

The invention herein described may be manufactured and used by or for the Government of the United States of America for governmental purposes without the payment to us of any royalty thereon.

This invention relates to an apparatus for measuring the resistance to airflow of the lungs and air passages. Such measurements are of value in making studies relating to:

(a) Establishment of statistically valid norms of breathing resistance in the population;

(b) The effects of drugs or atmospheric pollutants on the lungs and bronchial tube;

(c) Diagnosis of obstructive pulmonary diseases such as asthma, hay fever and emphysema;

(d) The progress of obstructive pulmonary diseases.

The device may also be used to measure up-stream resistance to flow in some non-biological gas flow systems and may have research and industrial applications in that field.

Basically the device consists of a rotary valve system which alternately interrupts and permits flow through a fixed resistance at a frequency of several cycles a second. It also alternately admits air to two pressure gauges which are connected in such a manner that one gauge registers the static fluid pressure immediately upstream of the fixed resistance during periods of flow and the other the pressure at the same point during periods of no flow. The fixed resistance is calibrated. The person whose lung-airway resistance is to be determined simply blows into the instrument for a few seconds. Then, by a calculation which will be explained later, the lung-airway resistance is readily determined.

The drawings shows in FIG. 1 a perspective, partially diagrammatic view of an embodiment of our invention. FIG. 2 shows an exploded view of the device shown in FIG. 1. In FIG. 2, external threads 32 engage internal threads (not shown) on the inside of the outer sleeve. A rubber plug 4 couples the drive shaft 9 to the rotary valve tube 3.

The device includes a stationary housing tube 1 and a rotary valve tube 3 which has a running fit within housing tube 1. (The clearance is exaggerated in the drawing to permit the parts to be shown clearly.) Both tubes are open at the first or inlet end 5 of the device and both are closed at the second end. Valve tube 3 is rotated rapidly, e.g., 150 r.p.m. by, for example, motor 7 and drive shaft 9. Rotary tube 3 is provided near its inlet end with circumferentially spaced apertures 11 and in its central portion with circumferentially spaced valve ports 13. Apertures 11 and valve ports 13 are equally spaced and, conveniently, aligned. The stationary housing tube 1 has intermediate its ends housing ports 15 which have the same circumferential spacing as valve ports 13.

Housing tube 1 also has conduit connections 17, 19, having the same position, longitudinally, as apertures 11. If apertures 11 are in alignment with valve ports 13, conduit connection 17 is aligned with one of the housing ports 15. In any case, conduit connection 17 is so positioned that it is in registry with one of the apertures 11 when valve ports 13 are in registry with housing ports 15. The second conduit connection 19 is so positioned that it is in registry with one of the apertures 11 when valve ports 13 are not in registry with housing ports 15.

To this end, the angular spacing between connections 17, 19 is made substantially different from that between apertures 11, or any integral multiple thereof. For example, apertures 11 (as well as ports 13 and 15) may be 90° apart while conduit connections 17, 19 are spaced 135°. Conduits 21 and 23 lead from connections 17 and 19 to pressure gauges 25 and 27, respectively. A manually actuated double stopcock 29 opens or closes conduits 21 and 23 simultaneously.

An outer sleeve 31 is provided which surrounds housing tube 1. It has a closed end 33 embracing housing tube 1 between housing ports 15 and conduit connections 17, 19. The remainder of sleeve 31 is spaced from housing tube 1, forming a restricted air passage, and terminates in an open end 35.

*Operation*

The subject blows into inlet end 5 while valve tube 3 is being rotated by motor 7 at, say 150 r.p.m. Stopcock 29 is opened. Flow of air through the resistance element formed by ports 13 and 15 and the spaced members 1 and 31 is alternately permitted and interrupted at a frequency of 10 times per second. For purposes of clarity, the drawings do not indicate all the ports 13 and 15. There are actually four present of each of the valve ports 13 and the housing ports 15 since they are spaced 90° apart. The shaft 9 and rotary valve tube 3 rotate at 150 revolutions per second. Since with each revolution of the valve tube 3 the four ports 13 are opened and closed four times, in 2.5 revolutions said ports are interrupted four times 2.5 or 10 times per second. Pressure gauge 25 records the pressure of the air at the inlet end of the device when the flow is taking place whereas gauge 27 records the (higher) pressure at the same point when flow is blocked. Since connections 17, 19 are sealed by rotor 3 when not in registry with apertures 11, gauges 25, 27 give substantially constant readings. The gage 27 will give the static pressure in the device because when one of the apertures 11 is in registry with the connection 19, the corresponding valve port 13 is not in registry with the housing port 15 due to the difference between the 90° and 135° location of the apertures 11 and the connections 17 and 19 so for an instant no air can flow and a relatively high pressure is recorded on the gage 27. Likewise, the gage 25 will give the pressure during flow through the device because when one of the apertures 11 is in registry with the connection 17, the corresponding valve ports 13 are in registry with the housing ports 15 and air can flow through the device for an instant and the pressure by which it flows is recorded by the gage 25. At a convenient time, stopcock 29 is closed, thus trapping the air in the gauges and permitting easy and accurate reading. The gauges 25, 27 measure the pressure relative to atmospheric.

*Calculations*

Resistance to flow of air under the conditions to with which we are concerned may be stated in terms of the rate of flow as follows:

$$R = \frac{\Delta P}{F^{1.6}} \tag{I}$$

where $\Delta P$ is the pressure drop and $F$ is the rate of air flow expressed in volume per unit time. More specifically we employ the definition $$R = \frac{\text{cm. H}_2\text{O}}{(L/\text{sec})^{1.6}} \tag{II}$$

Returning to Formula I it is obvious that $$\Delta P = RF^{1.6} \tag{III}$$

We calibrate our instrument and obtain its resistance, which we may term R$c$. The (unknown) resistance of the lungs and air passages we may term R$p$.

Let us now identify the pressure indicated by gauge 25, i.e., the pressure during flow, as P$_1$. This is the value for the drop in pressure across the instrument during air flow so that $$P_1 = RcF^{1.6} \qquad \text{(IV)}$$

Let us now identify the pressure indicated by gauge 27 as P$_2$. This is the pressure at apertures 11 during periods of no flow. Since there is no flow and therefore no pressure drop in the air passages, it is also the pressure in the lungs, during periods of no flow. Moreover, due to the high frequency of interruption the lungs maintain a constant pressure during the two parts of the cycle. Hence, P$_2$ also indicates the pressure in the lungs during periods of flow and $P_2 - P_1$ represents the drop in pressure between the lungs and mouth during flow. Hence:

$$P_2 - P_1 = RpF^{1.6} \qquad \text{(V)}$$

From Equations IV and V we obtain $$\frac{P_2 - P_1}{P_1} = \frac{R_p}{R_c} \qquad \text{(VI)}$$

(Note that the term F$^{1.6}$ cancels out).
Hence:

$$R_p = R_c \frac{P_2 - P_1}{P_1} \qquad \text{(VII)}$$

where:

$Rp$ = lung-airway resistance
$Rc$ = resistance of instrument (calibrated)
$P_2$ = pressure given by gauge 27 (no flow)
$P_1$ = pressure given by gauge 25 (flow)

*Variations*

Valve ports 13 and the housing ports 15 can form a first rotary valve while the apertures 11 and the conduit connections 17, 19, can form a second rotary valve upstream of the first rotary valve.

This valve system may be used with types of equipment for reading out the pressure flow data differing from that shown, for instance:

(1) With oscillographic recording for instantaneous recording of pressure flow patterns;

(2) With scanning equipment for continuous display of pressure flow characteristics;

(3) With integrating equipment for continuous calculation and recording of the resistance work of breathing; or (4) With ratioing devices for continuous registration of breathing resistance.

The system shown is, however, notable for its simplicity, portability and the ease and rapidity with which the lung-airway resistances may be obtained.

We claim:

1. A device for measuring the resistance to flow of fluid through closed passages between a source and the point of measurement comprising a resistance element constructed and arranged to receive fluid from said passages, said resistance element comprising a rotary valve constructed and arranged to alternately permit fluid to flow through said resistance when said valve is open and interrupt said flow when said valve is closed, means for measuring the pressure at a point upstream of said rotary valve when said rotary valve is open and when it is closed, and means to rapidly and continuously rotate said rotary valve.

2. A device for measuring the resistance to flow of fluid through a closed passage between a source and the point of measurement comprising: a resistance element constructed and arranged to receive fluid from said passage; said resistance element comprising a first rotary valve constructed and arranged to alternately permit fluid from said passage to flow through said resistance and interrupt said flow at a frequency of several times a second, a first and a second pressure gauge, a second rotary valve located upstream of said first rotary valve and rotatable in synchronism with said first rotary valve, said second rotary valve being constructed and arranged to admit fluid to said first pressure gauge only when said first rotary valve is open and to admit fluid to said second pressure gauge only when said first rotary valve is closed and means for rapidly rotating said valves.

3. A device for measuring resistance to flow in a closed passage comprising: a stationary housing tube having an open first end, a rotary valve tube within and having a running fit in said first tube and having an open first end within and adjacent said first end of said stationary tube, means closing the second end of said stationary tube and said rotary tube, circumferentially spaced apertures in said rotary tube adjacent said first end thereof, circumferentially spaced conduit connections on said stationary tube adjacent said apertures, circumferentially spaced valve ports in said rotary tube between said first apertures and the second end of said tube, circumferentially spaced housing ports in said stationary tube adjacent said valve ports being so positioned that (a) all said valve ports and all said housing ports are in registry at the same time, (b) said first conduit is in registry with one of said apertures only when said valve ports and housing ports are in registry and (c) said second conduit connection is in registry with one of said apertures only when said valve ports and housing ports are out of registry, a first pressure gauge and a second pressure gauge, a first conduit connecting said first conduit connection with said first pressure gauge, a second conduit connecting said second conduit connection with said second pressure gauge, and means for rapidly rotating said rotary tube.

4. A device as defined in claim 3 and further comprising a manually operable valve constructed and arranged to simultaneously open or close said first and second conduit.

5. A device as defined in claim 3 wherein the angular spacing of said apertures is the same as that of said valve ports and housing ports, while the angular spacing of said conduit connections differs substantially from that of said apertures or any integral multiple thereof.

References Cited in the file of this patent

UNITED STATES PATENTS

| | | |
|---|---|---|
| 2,089,432 | Ryan | Aug. 10, 1937 |
| 2,721,478 | Somerville | Oct. 25, 1955 |
| 2,772,567 | Boden | Dec. 4, 1956 |